Patented Apr. 24, 1923.

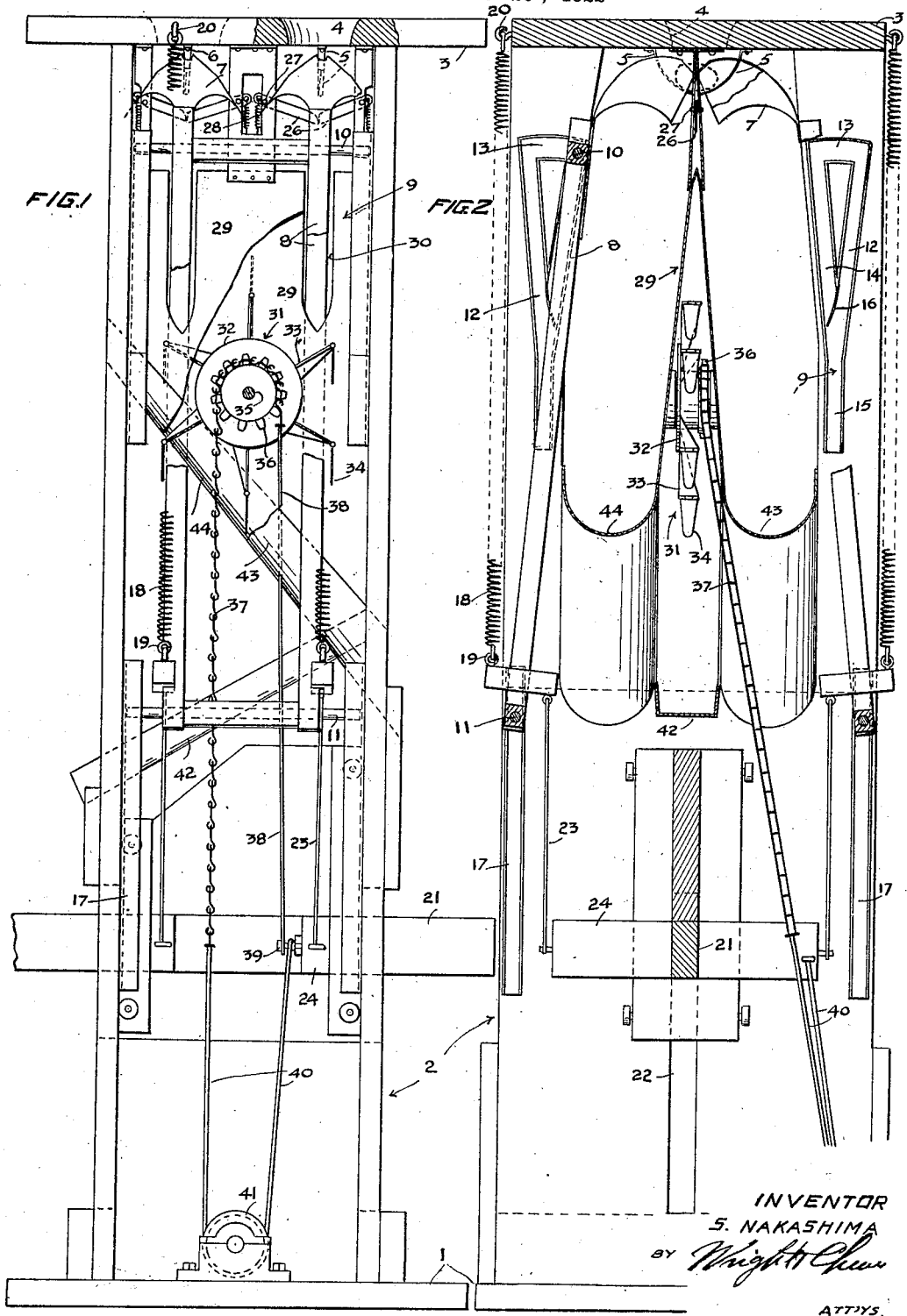

1,452,889

UNITED STATES PATENT OFFICE.

SOICHI NAKASHIMA, OF LIVINGSTON, CALIFORNIA.

FRUIT-PITTING MACHINE.

Application filed June 26, 1922. Serial No. 571,044.

*To all whom it may concern:*

Be it known that I, SOICHI NAKASHIMA, a subject of the Emperor of Japan, residing at Livingston, in the county of Merced and State of California, have invented new and useful Improvements in Fruit-Pitting Machines, of which the following is a specification.

This invention relates to improvements in machines for pitting plums, prunes, peaches and the like and resides in the provision of a simple and inexpensive machine of this character which will slice the fruit in halves and effectively remove and separate the pits or stones from the fruit in a simple and efficacious operation, which may be effected manually or with power means as desired.

One of the objects of the invention is to provide novel means for moving fruit so as to cut it in half and separate the halves in order that the pit may be readily removed, this arrangement being simple, compact and reliable in operation.

Another object is to provide novel means for engaging and removing the pits after the fruit has been cut in two or divided.

The invention possesses other features of novelty and improvement in respect to novel cutting means and other associated elements which form a part of the invention and resides in the particular interrelation, arrangement and combination of such elements, which will be set forth at length in the following description which I have selected for illustration in the drawings accompanying and forming a part of the present specification. In said drawings I have shown one form of the construction of my invention, but it is to be understood that I do not limit myself to such form since the invention as expressed in the claims may be embodied in a plurality of forms.

Referring to the drawing:

Fig. 1 represents a side elevation of the device of my invention, parts being broken away for the sake of clearness of illustration.

Fig. 2 represents a sectional view taken vertically through the machine at right angles to the showing in Fig. 1.

Referring to the embodiment of the invention shown in the accompanying drawing, 1 designates a base which may be fastened or otherwise rested upon a suitable support. Upon the base there is mounted an upstanding frame 2, which frame supports the mechanism of the invention and at its upper end carries a table 3 having openings 4 therein, through which the fruit is passed in order to be pitted.

Arranged within the frame 2 immediately beneath the openings 4 are resilient fruit holding fingers 5 which are arcuate in form and substantially engage each other adjacent their free ends so as to form a support for fruit dropped through the openings. These members 5 are fastened at certain ends as at 6 to the table and are of light resilient material so that they may be forced apart to allow fruit to pass between and below them.

Means is provided for engaging the fruit supported by the fingers 5 and forcing the fruit downwardly so as to carry out the slicing and pitting operation. This means comprises fruit gripping members 7 which are mounted in pairs with relation to each opening 4 and arranged to be moved into and out of position for encompassing the fruit, the said members being arcuate in shape or substantially cup-like. The members 7 are arranged upon opposite sides of the openings and each pair is supported on a frame 8 working in guide members 9 carried by the main frame 2. Each frame 8 is provided adjacent its upper and lower ends with trunnions 10 and 11. The trunnions 10 are adapted to slidably engage in slots 12 and 13 provided in the guides. The slots 12 are upwardly and outwardly inclined, whereas the shorter slots 13 extend horizontally inwardly from the upper ends of and at right-angles to the slots 12. Thus, when the frame 8 with the fruit gripping members 7 is moved upwardly into position the members 7 are directed first outwardly and upwardly to a position above the fruit in the holders 5 and a continued movement of the frame causes said members to move laterally and toward one another to the position shown in Fig. 2, whereby the fruit will be encompassed by said members. The inner ends of the slots 13 communicate with downwardly and outwardly inclined slots 14 which converge with the slots 12 into an upright lower slot 15. When the frames 8 are moved downwardly the members 7 are directed outwardly as well as downwardly and gradually separate or move away from one another but said members are maintained during such movement in fruit gripping position and move the fruit downwardly as well. There is provided a spring switch member 16 similar to a leaf spring which serves to obstruct the trunnions 10 in their upward movement and deflect the trunnions into the slot 12. The trunnions 11 are slidable in vertical guides 17 adjacent the lower portion of the main frame. This arrangement is provided on each side of the mechanism and each of the frames 8 is normally held in up position by heavy retractile springs 18 fastened as at 19 at their other lower ends to the lower portion of the frame 8 and at their upper ends as at 20 to the table member 3.

The frame members 8 are actuated in the present case by foot operated means but may be connected, if desired, with a motor or other power apparatus, not shown, so as to be power operated. It is thought unnecessary to illustrate the application of a power operating means. In the present instance the operating means comprises a cross bar 21 slidable vertically in slots 22 in the main frame 2 and projecting laterally from opposite sides of the main frame. Flexible elements 23 connect rigid extension members 24 on the bar 21 with the lower portions of the frames 8. When the treadle member 21 is depressed by the operator the frames 8 are lowered moving with them the fruit gripping members 7.

As a means for slicing the fruit so as to give access to the pits whereby they may be removed, I provide beneath each pair of holding fingers 5 and in line with the openings 4, a pair of cutting knives 26. Each knife 26 is pivoted near one end as at 27 to a part of the framework so that its other end is disposed in position to yieldingly engage the fruit as the latter is moved downwardly against the knife. The knives of each pair are arranged so that their free ends approximately engage one another to provide a substantially V-shaped cutting edge, taking into consideration the two knives. The pivots 27 are arranged adjacent to but spaced from certain ends of the knives and the ends adjacent the pivots have retractile springs 28 attached thereto. These springs exert a force so as to move the free ends of the knives upwardly whereby the knives will yieldingly resist the downward movement of the fruit, slice the fruit while thus yielding and spread apart so as to permit fruit to pass between the knives in its downward movement.

Arranged below the knives, is a wedge shaped dividing member 29 which the fruit engages after having been cut or split by the knives. This member is provided with vertical slots or openings 30 immediately in line with the openings 4 to permit portions of the members 7 to pass downwardly within said openings 30 and engage and continue to move the fruit downwardly.

The member 29 is hollow and adjacent its lower portion contains means generally designated 31 for removing the pits from the split pieces of fruit. This member comprises a circular or wheel-like body portion 32 having arms 33 radiating therefrom. Pivoted on the outer ends of the arms 33 are striker members 34 which, when the wheel is rotated, will strike the pits in the fruit held upon the wedge member 29 and thereby separate the pits from the fruit. The wheel member 32 is mounted upon a shaft 35 mounted within the member 29 and has a sprocket wheel 36 fixed thereto. A sprocket chain 37 extends around the upper side of the wheel and at one end is fastened to a flexible element 38 which is secured as at 39 to the cross bar 24. Extending from the point 39 from the cross bar and downwardly is a flexible element 40 which extends under a pulley 41 fastened on the base 1 and then upwardly, and at its other end is connected with the other end of the sprocket chain. It will thus be seen that when the member 21 is depressed the chain will be pulled so as to rotate the sprocket wheel and the wheel 32 thus rapidly turning the arms 33 causing the striker members 34 to be drawn outwardly by centrifugal force such that they will strike the pits of the fruit being forced downwardly on the wedge member 29.

Beneath the wedge member 29 is an inclined trough 42 which is adapted to catch the pits and deliver them to one side of the machine. At the lower ends of the member 29 there are provided inclined chutes 43 and 44 which are adapted to catch the split halves of the fruit separated by the member 29 and arranged to deliver said halves to receptacles, not shown, which may be placed upon one side of the main frame.

The operator depresses the bar 21 and by then allowing the bar to be pulled upwardly by the action of the springs 18 to such extent that the trunnions 10 are at the entrance end of the grooves 13, and then holding the bar 21 so as to maintain such position of the trunnions, the frames 8 with the members 7 will be held in outwardly spaced relation to the fruit supporting fingers 5. The operator then drops pieces of fruit through the openings 4 and the fruit will be supported by the fingers 5. By releasing the treadle bar 21, the springs will exert a slight upward pull on the frames and then move the upper ends thereof inwardly so as to bring the members 7 towards one another. This latter forcing of the spring is provided for by the manner in which the lower ends of the springs are attached to the frames 8 above and to one side of the trunnions 11, which trunnions serve as pivot points. As the members 7 are moved towards one another they will engage over the upper sides of the fruit and by then pushing downwardly on the member 21 the fruit will be moved downwardly and the fingers 5 will be forced apart so as to allow the fruit to be thus moved. Continued downward movement of the member 21 moves the fruit into contact with the cutting knives 26 and as said knives yield downwardly they will slice around the fruit in a vertical line, spreading apart so as to permit fruit to pass between them, while so yielding. The fruit thus cut or separated is moved upon continued downward movement of the member 21 in contact with the upper edge of the wedge shaped divider 29. During downward movement of the frames 8 they are directed outwardly so that the members 7 gradually move away from one another. This will permit said members to move on opposite sides of the wedge shaped member 29 but at the same time cause the said member 7 to engage and continue to move the fruit. The knives 26 serve to only partially separate the fruit in halves but as the fruit moves downwardly upon the member 29, said wedge member being sharp, splits the fruit. The fruit is thus held apart on the member 29 so that the seed or pits are subject to being struck by the members 34 on the pitting device. The mechanism is so arranged that substantially co-incident with the striking of the pit in the piece of fruit, with the member 34, the fruit will be advanced to such position on the divider 29 that the halves will be forced apart and drop into the troughs 43 and 44, whereas the pits will drop into the trough 42. After the fruit has been split and pitted, the operator allows the springs 18 to pull upwardly on the frame again moving the members 7 into position to engage and move fresh pieces of fruit downwardly so as to be sliced and pitted. It will thus be seen that the pitting and slicing operation may be carried out continuously and that power operating means may be applied to the device of the invention, if desired. During the downward movement of the frames and member 7, the sprocket chain 37 will be moved so as to rotate the wheel 32 and cause the striker members 34 to be forcibly thrown outwardly by centrifugal action. The slots or openings 30 permit the members 7 to maintain a holding grip upon the fruit during the entire downward movement of the fruit but to the point where the halves separate from one another and the pit is struck and knocked downwardly into the trough 42.

It will thus be seen that with the apparatus of my invention fruit may be sliced and pitted in a reliable and expeditious manner without mutilating the fruit and at less expense than is ordinarily the case in pitting fruit.

I claim:

1. A fruit pitting machine comprising a frame having a table at its upper end provided with openings through which pieces of fruit to be pitted are dropped, means located immediately beneath the openings for engaging and releasably supporting pieces of fruit dropped through the openings, fruit gripping members mounted in the frame so as to be movable towards one another on opposite sides of the fruit supporting members and into engagement with which said fruit is moved, means for moving said fruit gripping members downwardly to move the fruit into contact with and beneath said knives, a rotating member beneath the knives having striker members pivoted thereon and arranged to engage pits of the fruit as the fruit is moved downwardly and means causing rotation of said rotary member coincident with the downward movement of the fruit past the knives.

2. A fruit pitting machine comprising a frame having a table at its upper end provided with openings through which pieces of fruit to be pitted are dropped, means located immediately beneath the openings for engaging and releasably supporting pieces of fruit dropped through the openings, fruit gripping members mounted in the frame so as to be movable towards one another on opposite sides of the fruit supporting members and into engagement with which said fruit is moved, means for moving said fruit gripping members downwardly to move the fruit into contact with and beneath said knives, a rotating member beneath the knives having striking members pivoted thereon and arranged to engage pits of the fruit as the fruit is moved downwardly, means causing rotation of said rotary member co-incident with the downward movement of the fruit past the knives and a wedge shaped fruit dividing member into contact with which the fruit is moved after being moved past the knives.

3. A fruit pitting machine comprising a frame, a table on the upper end of the frame having openings therein through which openings pieces of fruit are adapted to be dropped, means located beneath the openings for releasably supporting pieces of fruit dropped through said openings, fruit engaging members adapted to engage the fruit supported by said supporting members and move the fruit downwardly, supports for said fruit engaging members mounted so as to be vertically movable within said frame and upon the upper ends of which said fruit engaging members are supported, spring means normally holding the said supporting members in up position, means which when said supporting members are moved upwardly cause said members to move outwardly so as to separate the fruit engaging members and then move inwardly so as to cause said members to engage and encompass the fruit supported in said fruit supporting member, cutting means located below the fruit supporting members and means for depressing said frames to move the fruit engaging members downwardly.

4. A fruit pitting machine comprising a frame, a table on the upper end of the frame having openings therein through which openings pieces of fruit are adapted to be dropped, means located beneath the openings for releasably supporting pieces of fruit dropped through said openings, fruit engaging members adapted to engage the fruit supported by said supporting members and move the fruit downwardly, supports for said fruit engaging members mounted so as to be vertically movable within said frame and upon the upper ends of which said fruit engaging members are supported, spring means normally holding the said supporting members in up position, means which when said supporting members are moved upwardly cause said members to move outwardly so as to separate the fruit engaging members and then move inwardly so as to cause said members to engage and encompass the fruit supported in said fruit supporting member, cutting means located below the fruit supporting members, means for depressing said frames to move the fruit engaging members downwardly, a wedge shaped member into engagement with which the fruit is moved by said fruit engaging members after the fruit has been moved past the cutting means and rotary means adapted to strike and eject the pits of the fruit from the fruit meat.

5. A fruit pitting machine comprising a frame, a table at the upper end of the frame having openings therein through which pieces of fruit are dropped, resilient fruit supporting fingers arranged beneath the openings so as to releasably support the fruit dropped through said openings, a pair of cutting knives mounted beneath each opening below said fingers, means for supporting said knives in position to yieldingly engage fruit moved downwardly against the knives, fruit engaging members adapted to engage the upper side of fruit supported by said fingers, means for moving said engaging members into position to engage the fruit supported by said fingers, means for moving said fruit engaging members downwardly to force the fruit beneath the resilient fingers and into contact with said knives, a wedge shaped dividing member into contact with which the fruit is moved after being engaged with the knives, said member having vertical slots therein at points in line with said knives and openings and a rotary pit engaging member mounted in the frame so as to engage pits of pieces of fruit while the fruit is moved downwardly on said wedge member on opposite sides of said slots.

SOICHI NAKASHIMA.